United States Patent
Jayaraman et al.

(10) Patent No.: US 12,164,623 B2
(45) Date of Patent: Dec. 10, 2024

(54) PASSWORD RESET FOR MULTI-DOMAIN ENVIRONMENT

(71) Applicant: Microsoft Technology Licensing, LLC, Redmond, WA (US)

(72) Inventors: Kameshwar Jayaraman, Redmond, WA (US); Nicholas Elliot Claunch, Everett, WA (US); Priyanshu Kumar Jha, Kirkland, WA (US); Shankaranand Arunachalam, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 17/220,204

(22) Filed: Apr. 1, 2021

(65) Prior Publication Data

US 2021/0216622 A1    Jul. 15, 2021

Related U.S. Application Data

(62) Division of application No. 15/958,948, filed on Apr. 20, 2018, now Pat. No. 11,023,573.

(51) Int. Cl.
*G06F 21/45* (2013.01)
*G06F 21/34* (2013.01)
(Continued)

(52) U.S. Cl.
CPC .............. *G06F 21/45* (2013.01); *G06F 21/34* (2013.01); *H04L 9/0861* (2013.01); *H04L 63/06* (2013.01); *H04L 63/0823* (2013.01); *H04L 63/083* (2013.01); *H04L 63/102* (2013.01); *G06F 2221/2131* (2013.01)

(58) Field of Classification Search
CPC ....... G06F 21/45; G06F 21/34; H04L 9/0861; H04L 63/06; H04L 63/0823; H04L 63/083; H04L 63/102
See application file for complete search history.

(56) References Cited

U.S. PATENT DOCUMENTS 6,643,784 B1 *  11/2003  McCulligh ............ H04L 63/083
                                                    704/10
6,934,848 B1 *   8/2005  King ..................... G06Q 20/367
                                                    707/999.009

(Continued)

FOREIGN PATENT DOCUMENTS

CN            104919775 A       9/2015

OTHER PUBLICATIONS

"Notice of Allowance Issued in European Patent Application No. 19719704.9", Mailed Date: Sep. 15, 2022, 2 Pages.
(Continued)

*Primary Examiner* — Harris C Wang
(74) *Attorney, Agent, or Firm* — Schwegman Lundberg & Woessner, P.A.

(57) ABSTRACT

A computer implemented method is used for changing a password in a multi-domain environment. The method includes obtaining a private key and a public key from a security card at a user device in a user domain, transferring the public key to a controller in a secure domain, requesting a password change, receiving a public key encrypted new password from the secure domain, and decrypting the new password using the private key.

18 Claims, 6 Drawing Sheets

(51) Int. Cl.
  *H04L 9/08* (2006.01)
  *H04L 9/40* (2022.01)

(56) References Cited

U.S. PATENT DOCUMENTS

| | | | |
|---|---|---|---|
| 8,812,857 B1* | 8/2014 | Robison | H04L 9/3234 713/176 |
| 9,558,341 B1* | 1/2017 | Allababidi | G06F 21/45 |
| 9,699,167 B1* | 7/2017 | Tovino | H04L 63/0428 |
| 10,146,931 B1* | 12/2018 | Kronrod | H04L 63/0846 |
| 2003/0182584 A1* | 9/2003 | Banes | G06F 21/34 713/182 |
| 2005/0138390 A1* | 6/2005 | Adams | G06F 1/1632 713/185 |
| 2007/0186099 A1* | 8/2007 | Beck | H04L 63/06 713/159 |
| 2008/0046982 A1* | 2/2008 | Parkinson | H04L 9/0891 726/5 |
| 2008/0148046 A1* | 6/2008 | Glancey | G06F 21/34 713/156 |
| 2009/0158406 A1 | 6/2009 | Jancula et al. | |
| 2014/0075524 A1* | 3/2014 | Ho | G06F 21/45 726/6 |
| 2016/0171208 A1* | 6/2016 | Matthiesen | H04L 63/102 726/6 |
| 2016/0191499 A1* | 6/2016 | Momchilov | G06F 21/78 713/171 |
| 2016/0352702 A1* | 12/2016 | Gallant | G06F 21/31 |
| 2017/0230355 A1* | 8/2017 | Su | H04L 63/0435 |
| 2018/0227288 A1* | 8/2018 | Zhu | G06F 21/602 |

OTHER PUBLICATIONS

"Office Action Issued in Indian Patent Application No. 202047037740", Mailed Date: Aug. 12, 2022, 6 Pages.

"Notice of Allowance Issued in European Patent Application No. 19719704.9", Mailed Date: May 27, 2022, 7 Pages.

Mannan, et al., "Mercury: Recovering Forgotten Passwords Using Personal Devices", Post-proceedings of Financial Cryptography and Data Security 2011, pp. 316-318, Nov. 18, 2011.

Office Action Received for Chinese Application No. 201980026903. 8, mailed on Dec. 15, 2023, 15 pages.

Notice of Grant Received for Chinese Application No. 201980026903. 8, mailed on May 8, 2024, 4 pages (English Translation Provided).

* cited by examiner

PASSWORD RESET FOR MULTI-DOMAIN ENVIRONMENT

CROSS REFERENCE TO RELATED APPLICATIONS

This application is a divisional of and claims priority to U.S. application Ser. No. 15/958,948, filed Apr. 20, 2018 and entitled "Password Reset for Multi-Doman Environment." The contents of this prior application is considered as part of this application, and is hereby incorporated by reference in its entirety.

BACKGROUND

Resetting passwords by a user in an enterprise computing environment co-existing with a secure environment can be problematic. User's tend to pick passwords that are easy for the user to remember, which may also make the passwords easier to derive by others.

One method of resetting user passwords uses administrative people (admins) on a domain controller in the secure environment and sends the new passwords to users. This method uses manual resets, where the admin also knows the password. Dissemination of the passwords to user can also be a security problem, as others may be able to view the password.

Other methods of resetting passwords include providing an automated outside-in solution that uses federated authentication. Many environments do not have federated authentication.

SUMMARY

A computer implemented method is used for changing a password in a multi-domain environment. The method includes obtaining a private key and a public key from a security card at a user device in a user domain, transferring the public key to a controller in a secure domain, requesting a password change, receiving a public key encrypted new password from the secure domain, and decrypting the new password using the private key.

A computer implemented method of generating a new password for accessing user accounts in a multi domain environment includes receiving a certificate in a secure domain, the certificate securely identifying a user from a user domain and including a user public key, updating a user account data entry in an active directory in the secure domain with the public key, receiving a request to reset a user account password, verifying the request via the directory, generating a new password in response to the verification, encrypting the new password using the public key, and sending the encrypted password to the user in a user domain.

A device includes one or more processors and a memory device coupled to the one or more processors and having a program stored thereon for execution by the processor to perform operations. The operations include receiving a certificate in a secure domain, the certificate securely identifying a user from a user domain and including a user public key, updating a user account data entry in an active directory in the secure domain with the public key, receiving a request to reset a user account password, verifying the request via the directory, generating a new password in response to the verification, encrypting the new password using the public key, and sending the encrypted password to the user in a user domain.

DETAILED DESCRIPTION

Figure 1:
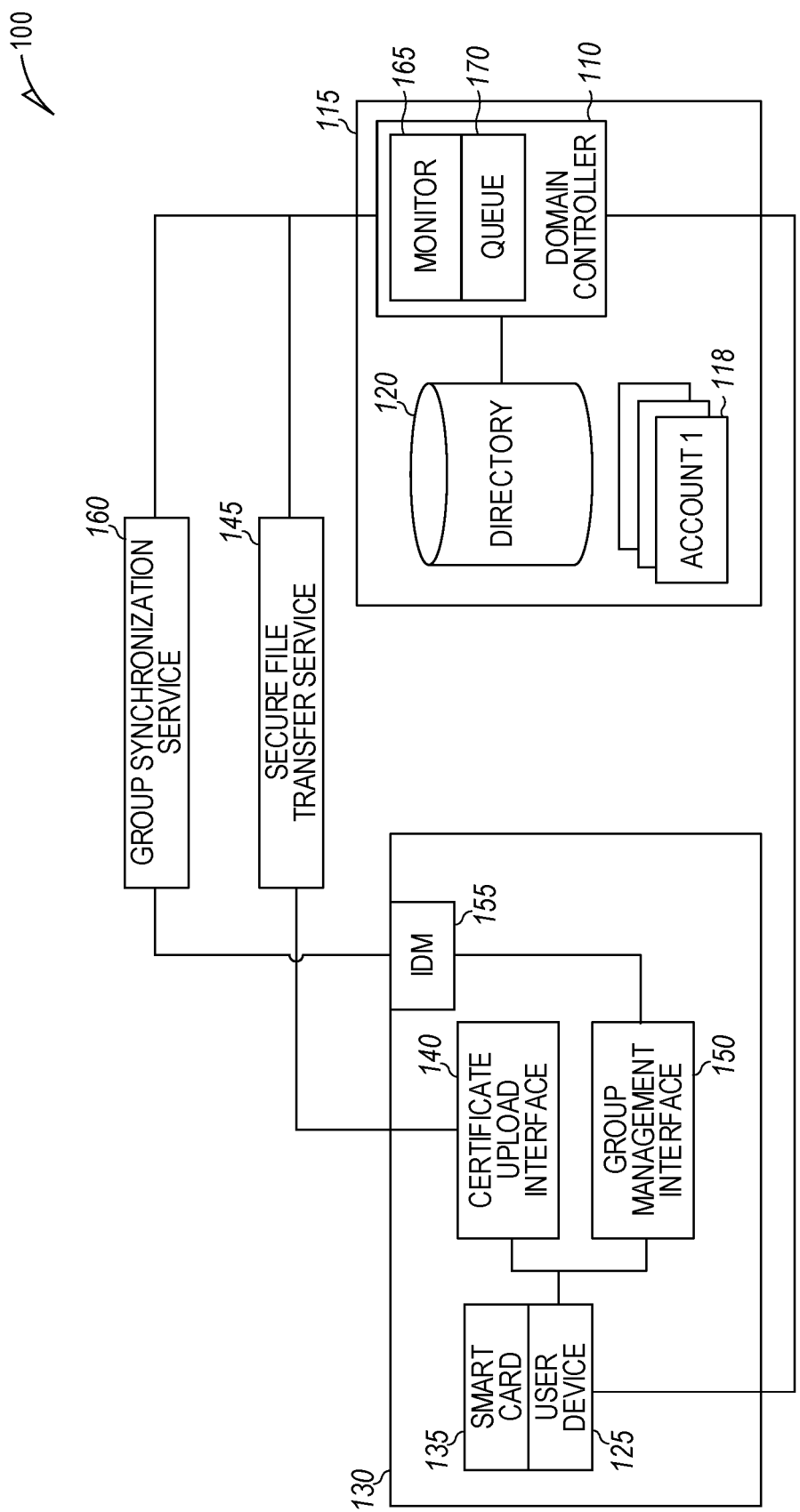
FIG. 1 is a block diagram of a system in which account passwords are reset by a secure domain in a multi-domain environment according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Resetting passwords by a user in an enterprise computing environment co-existing with a secure environment can be problematic. User's tend to pick passwords that are easy for the user to remember, which may also make the passwords easier to derive by others. Having an admin in the trusted environment reset the password can lead to higher strength passwords, but the admin then has knowledge of the password. In addition, informing the user of the password in a secure manner can be problematic.

In various embodiments, a password reset service in a secure environment may be used to reset a password and generate a new optionally random password for a user device in an enterprise environment. Secure environments generally do not have a trust established with other environments, making it difficult to determine if a user device in the enterprise environment is actually authorized to request a password change. It is also difficult to communicate a new password back to the user device in a secure manner.

In one embodiment, certificate based authentication for users utilizes a lookup table between a secure environment, also referred to as a production environment, and the user's environment. A security card, such as a smart card may be used to provide a public key to the secure environment and a private key to the user device, facilitating asymmetric encryption/decryption of the password by a password reset service in the secure environment.

A group based membership may be used to signal a user's intent to reset account passwords and from a service perspective query the accounts to reset the password against. The password reset service makes use of a secure file transfer service which allows transferring of files between enterprise environments and secure environments.

A Group management service such as IDM (identity manager) may be used to manage the secure environment from the enterprise environment. A requesting interface may be used to interface to IDM which manages group memberships in secure environment. For example, IDM may utilize a mapping between usernames of users in the enterprise environment with their corresponding accounts in secure environment. A smart card may be used by the user to access the secure environment.

FIG. 1 is a block diagram of a system 100 in which passwords may be reset by a domain controller 110 in a secure domain indicated as secure environment 115. The secure environment may maintain a list or mapping of users and their accounts 118 in an active directory 120 coupled to the domain controller 110. Lines shown connecting the various elements in FIG. 1 are representative of communication connections, which may be hardwired or wireless using various different communication protocols and networks for transfer of data.

A user, represented by a user device 125 is located in a different domain, such as an enterprise environment 130. The user may use a security card, such as a smart card 135 or other type of device that stores data securely and can be used to provide a certificate to the user device 125. Smart cards may contain integrated circuitry and may operate via contact or contactless data transfer to provide personal identification, authentication, data storage and other functions. Smart cards may provide strong security authentication for system or user device access. In one embodiment, the smart card 135 contains a public key and a private key for public/private encryption where a device with the public key can encrypt information that can be decrypted with the private key. The certificate may include the public key and user identifying information, such as a user id. The certificate should be issued to the user by a trusted authority.

In one embodiment, the user is not allowed the change their own account passwords. Accounts may include anything from email accounts to accounts that provide electronic access to bank or other financial accounts. Many other types of accounts may be hosted in various secure domains. Any time prior to requesting a password reset, the certificate may be uploaded via a certificate upload interface 140 to a secure file transfer service 145, which may reside in a network/cloud, and provides for secure file transfer to devices in the secure environment 115, such as the domain controller 110. The domain controller 110 will update the active directory 120 entry for the user with the transferred user certificate. The active directory 120 in one embodiment may include a secure environment user id, enterprise environment user ID, and the smart card public key.

A user, via user device 125 may add their account to a group for changing passwords for the secure environment using a group management interface 150 to group sync across the enterprise environment using a group management service such as IDM (identity manager) 155. IDM 155 provides the account for which a password reset is being requested to the group synchronization service 160 such the account is added to the password reset group. The password reset group 160 is monitored by a password reset service 165 that monitors the password reset group for new entries picks up the account and adds it to a password reset queue 170. The service 165 and queue 170 may be either inside or outside of the secure environment 115, and in some embodiments, may be part of domain controller 110.

The certificate upload interface 140 requires users to put the smart card 135 into a device. On finding the smart card, interface 140 reads information on the smart card to ensure that the smart card has been issued to the user who is executing this upload and that the certificate is valid. After doing all the checks and validation, it converts the certificate into a base64 encoded byte array and utilizes the secure file transfer service 145 in order to upload the certificate with only its public key to a particular location inside the secure environment 115. A service, monitor 165, running on the domain controller 110 in the secure environment 115 polls this location for new certificates. On finding a new certificate, the service picks up the certificate, finds the identifying information from the certificate, makes the correlation with which account in the active director 120 that the certificate belongs to. The service then updates the account in AD with this certificate.

Group management interface 150 is a user Interface to IDM 155 eligibilities. Eligibilities in IDM 155 are configured with finding association between accounts in the enterprise environment 130 and the secure environment 115, and when requested by a user in enterprise environment 130, to add their corresponding secure environment account to the group in the secure environment 115.

The "Eligibilities" also have a time to live (TTL), which basically means that after TTL is achieved, the secure environment account is removed from the group.

In one embodiment, users "Request" a configured password reset eligibility through the group management interface 150. On getting this eligibility, IDM finds the user's corresponding secure environment account and adds it to a "Password Reset" AD group in the secure environment 115. After a configured TTL is achieved, this account is then removed from the group. During the time that the account is in the password reset group, a password reset service running on domain controller 105 (monitor 165), polls the group, finds the account, and performs the password reset.

Figure 2:
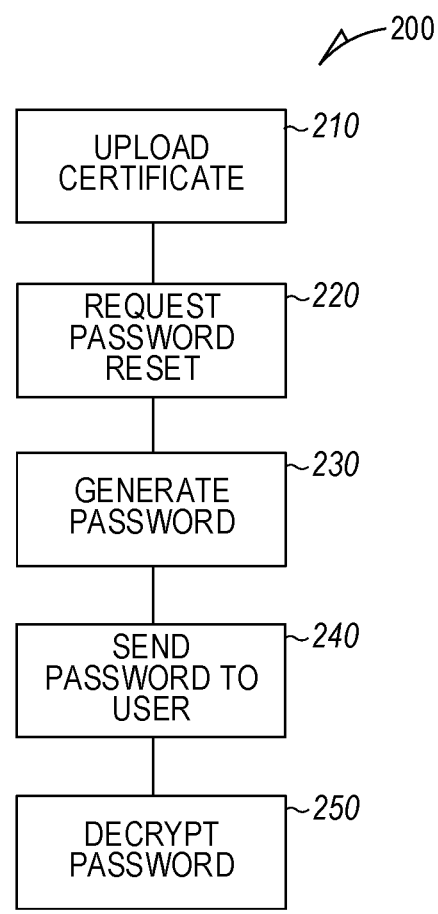
FIG. 2 is a flowchart illustrating a password reset method according to an example embodiment.

FIG. 2 is a flowchart illustrating a password reset method 200 that can be broken down into several general operations. First, a smart card certificate is uploaded from a user device at operation 210 to the secure environment. The smart card may be physically inserted in the user device, or held near the user device for wireless or physical transfer of the certificate from the smart card to the user device. Next, a password reset is requested at operation 220 through the group management service. Finally, the password is generated at operation 230, sent to the user at operation 240, and decrypted at operation 250, using the secure environment smart card via the user device. In one embodiment, a pin is required from a user of the device for one or more of the above steps to increase security. The private key, for instance, may only be provided in response to the correct pin being provided.

Figure 3:
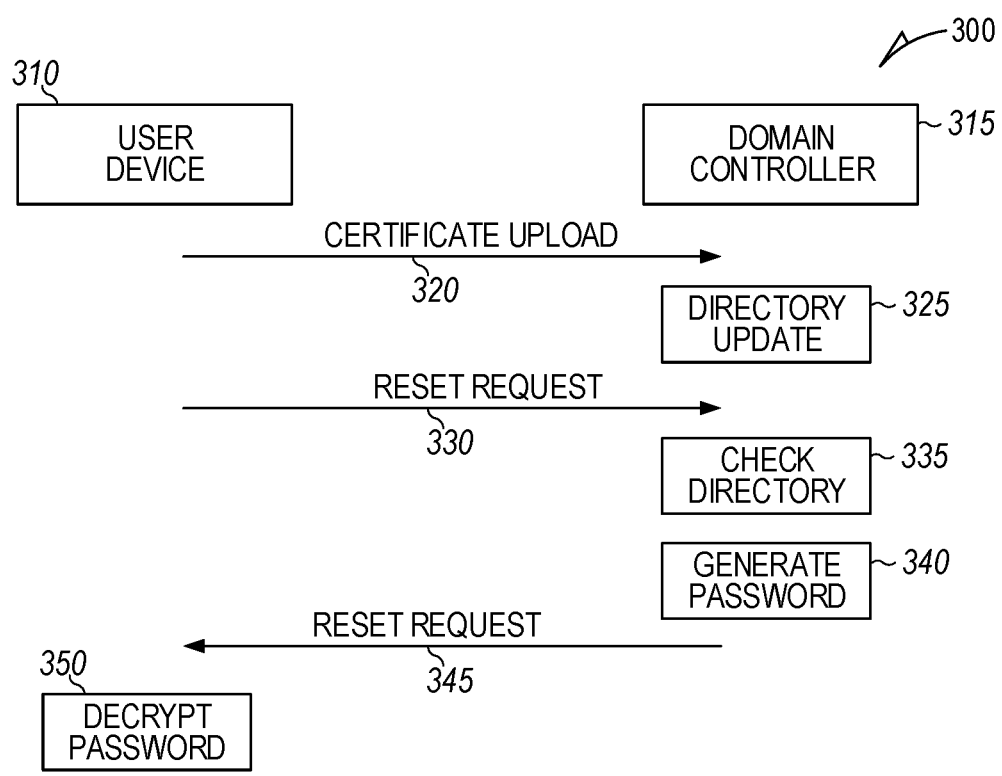
FIG. 3 is a communication flow diagram illustrating the flow of communications between a user device in a user domain and a controller in a secure domain according to an example embodiment.

FIG. 3 is a communication flow diagram 300 illustrating the flow of communications between a user device 310 and a domain controller 315. The user device 310 resides and executes in a first domain, the enterprise environment 130. The domain controller 315 resides and executes in a second secure domain, referred to as secure environment 115. The secure environment may be host to one or more user accounts. Note that the communications may also flow through other services, such as group synchronization and secure file transfer services as illustrated in FIG. 1, but which are not shown in FIG. 3 for ease of illustration.

At any time prior to requesting a password reset, a certificate upload 320 is performed. The certificate upload 320 involves a user device 125 to interact with the certificate update interface 140. The user device picks up the public key of the user's smart card 135 certificate and uploads it to a file location in secure environment 115 using a secure file transfer service 145. The secure file transfer service 145 may require the user to be authenticated in the enterprise environment 130 as well as checks the certificate to make sure the user uploading the certificate is the one certificate was assigned to. Once the certificate is uploaded to the secure environment 110, the password reset service, running on domain controller 315, picks up the certificate, looks up the information that which users it belongs to, and update the user's account with the certificate public key at 325.

A password reset request 330 is then generated by the user device 310. The request 330 may be generated in response to a password expiring or for other reasons. In one embodiment, the user device interacts with the group management interface 150 to add the user account to a password reset group in the group synchronization service 160 by synching across the enterprise environment 130 using the group management service 155. The password reset group is monitored by the password reset service 165 which extracts the account on which the password is to be reset and adds the account to the password reset queue 170.

The password reset service 165, verifies that a certificate has been uploaded for these accounts by checking 335 the directory 120 and resetting the account password by generating a new password at 340. The new password may be a random password having security conscious number of characters to ensure that the password is difficult to determine. The new password is encrypted using a public key and sent at 345, such as by an email with an expiry time to the user. The expiry time may be any time suitable for a desired security strategy. A shorter time may be used for a higher level of security, such 5-20 minutes. Several hours may be used in further embodiments for lower levels of security. The user, on receiving the email, may put their smart card into smart card reader associated with the user device 310, causing a decryption tool to retrieve a private key, and decrypt the encrypted password using the private key to provide the user with the password. A personal identification number (PIN) in one embodiment is used to effect decryption to further increase security. The decrypted password may be stored in the user device for use in accessing the account in the secure environment. Storing the password can be helpful where the length and randomness of the password make it difficult for the average user to remember and enter correctly. The use of the smart card to access the user device in combination with local storage of the password can relieve the user of having to remember and enter the password, allowing the password to be quite long, such as in excess of 10 or 20 characters while maintaining security. The user may simply need to remember a 4 to 8-character pin number for example.

Figure 4:
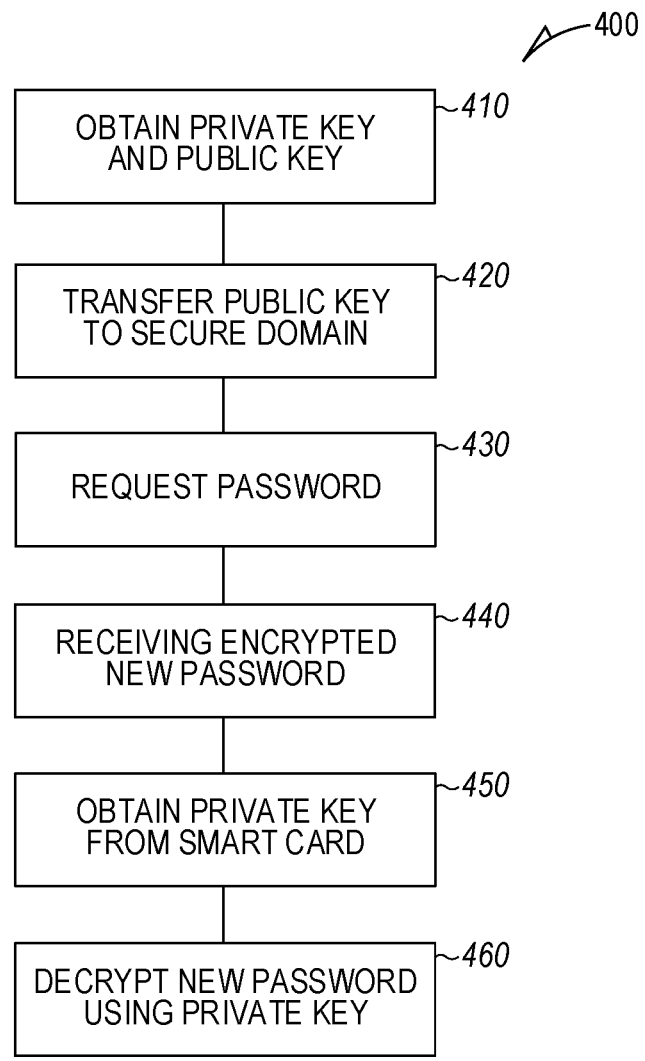
FIG. 4 is a flowchart illustrating a method of changing a password in a secure multi-domain environment according to an example embodiment.

FIG. 4 is a flowchart illustrating a method 400 of changing a password in a secure multi-domain environment. At operation 410, a user device in response to use of a security card, obtains a private key and a public key from the security card. The security card in combination with an access pin may be used to control access by a user to the user device. The user device in one embodiment is in a user domain, such as an enterprise domain or other domain. The public key may be transferred by the user device via operation 420 to a secure file transfer service for further transfer to a secure domain. A directory in the secure domain obtains the public key and associates it with one or more user accounts in the directory.

At operation 430, the user device requests a password change. The request may be used to add an identification of the user to a password reset group in a group synchronization service. The group is monitored, and results in an identification of the user being added to a password reset queue, checked against the directory in the secure domain, and a new password being generated, encrypted with the public key of the user. The encrypted password is sent to the user via email or other message transfer service.

At operation 440, the user device receives the public key encrypted new password from the second domain. To decrypt the password, the private key may be obtained from the security card, optionally upon entry of a PIN, and the new password is decrypted using the private key at operation 450.

Figure 5:
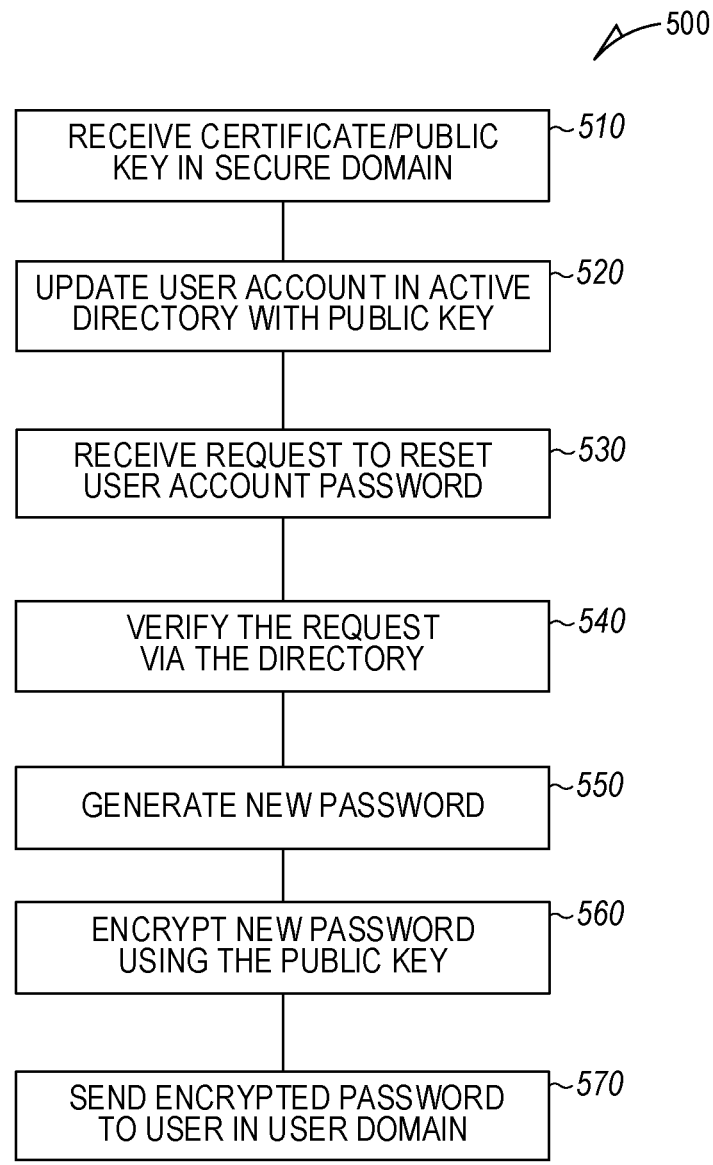
FIG. 5 is a flowchart illustrating a method of generating a new password for accessing user accounts in a multi domain environment according to an example embodiment.

FIG. 5 is a flowchart illustrating a method 500 of generating a new password for accessing user accounts in a multi domain environment. Method 500 in one embodiment may work in concert with method 400, each method exchanging data to reset a password to a user account in a secure domain, while the user is working on a user device in a different domain.

At operation 510, a certificate is received in a secure domain. The certificate securely identifies the user from the user domain and includes a user public key. The secure domain updates a user account data entry at operation 520 in an active directory in the secure domain. The entry is also updated with the public key. Operation 530 receives a request from the user to reset a user account password. The request may be in the form of an entry in a password reset group added by group synchronization service in response to the user adding the request to a group management interface in the user domain. The secure domain may monitor the password reset group for such entries The request is verified via the directory in the secure domain via operation 540. If the requested is correct, operation 550 generates a new password. The password may be a random string of characters that is long enough to be strong, or very difficult to guess or derive, from a security point of view. The new password may be encrypted at operation 560 using the public key obtained from the directory. The encrypted password is then sent via operation 579 to the user in a user domain for decryption and use to access the corresponding account.

Figure 6:
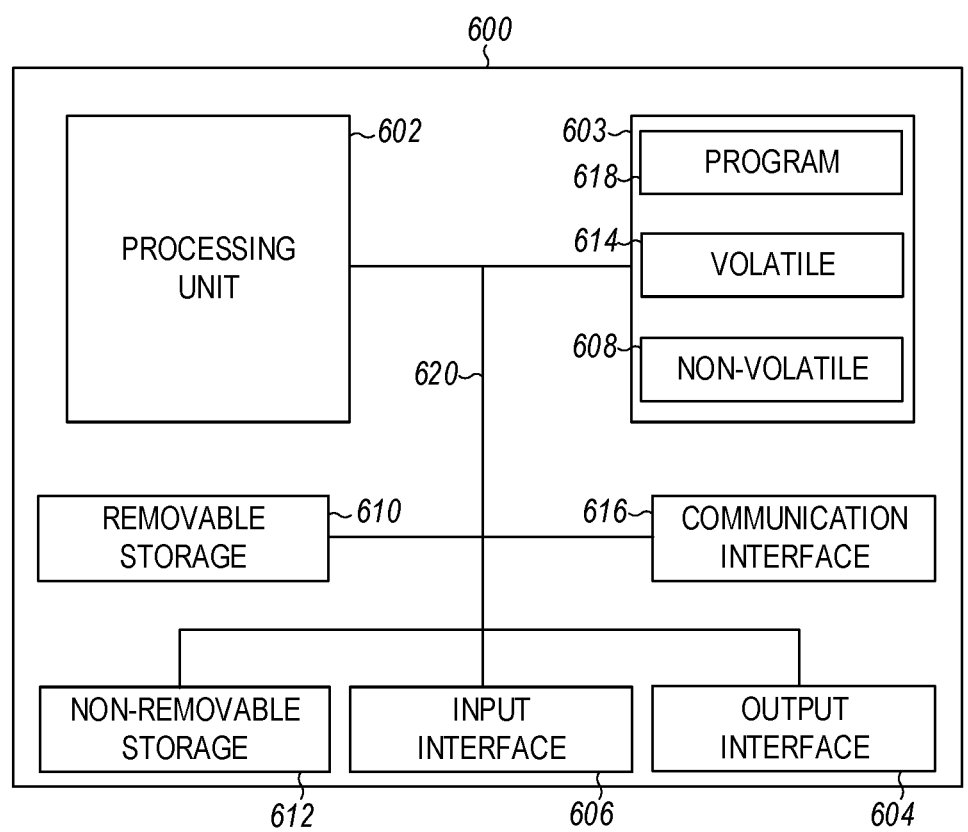
FIG. 6 is a block schematic diagram of a computer system to implement one or more example embodiments.

FIG. 6 is a block schematic diagram of a computer system 600 to implement and manage password reset functions for multi-domain environments and for performing methods and algorithms according to example embodiments. All components need not be used in various embodiments. Note that one or more such computer systems may be used for the various environments and services, such as cloud based systems running one or more virtual machines, or local computer systems for one or more of the different environments and services. Variations of computer system 600 may be used for the smart card and user device in one domain, for the secure file transfer and group management services, and for the controller and directory, as well as the account services in the secure domain.

One example computing device in the form of a computer 600 may include a processing unit 602, memory 603, removable storage 610, and non-removable storage 612. Although the example computing device is illustrated and described as computer 600, the computing device may be in different forms in different embodiments. For example, the computing device may instead be a smartphone, a tablet, smartwatch, smart storage device (SSD), or other computing device including the same or similar elements as illustrated and described with regard to FIG. 6. Devices, such as smartphones, tablets, and smartwatches, are generally collectively referred to as mobile devices or user equipment.

Although the various data storage elements are illustrated as part of the computer 600, the storage may also or alternatively include cloud-based storage accessible via a network, such as the Internet or server based storage. Note also that an SSD may include a processor on which the parser may be run, allowing transfer of parsed, filtered data through I/O channels between the SSD and main memory.

Memory 603 may include volatile memory 614 and non-volatile memory 608. Computer 600 may include—or have access to a computing environment that includes-a variety of computer-readable media, such as volatile memory 614 and non-volatile memory 608, removable storage 610 and non-removable storage 612. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 600 may include or have access to a computing environment that includes input interface 606, output interface 604, and a communication interface 616. Output interface 604 may include a display device, such as a touchscreen, that also may serve as an input device. The input interface 606 may include one or more of a touchscreen, touchpad, mouse, keyboard, camera, one or more device-specific buttons, one or more sensors integrated within or coupled via wired or wireless data connections to the computer 600, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 600 are connected with a system bus 620.

Computer-readable instructions stored on a computer-readable medium are executable by the processing unit 602 of the computer 600, such as a program 618. The program 618 in some embodiments comprises software to implement one or more. . . . A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 618 along with the workspace manager 622 may be used to cause processing unit 602 to perform one or more methods or algorithms described herein.

Examples

In example 1, a computer implemented method is used for changing a password in a multi-domain environment. The method includes obtaining a private key and a public key from a security card at a user device in a user domain, transferring the public key to a controller in a secure domain, requesting a password change, receiving a public key encrypted new password from the secure domain, and decrypting the new password using the private key.

Example 2 includes the method of example 1 wherein the public key is transferred to a secure file transfer service for transfer to the controller in the secure domain.

Example 3 includes the method of example 2 wherein the public key is transferred to the secure file transfer service via a certificate upload interface.

Example 4 includes the method of any of examples 1-3 wherein requesting a password change comprises requesting a password reset via a group management interface.

Example 5 includes the method of example 4 wherein the password reset request adds an indication of a user account to a password reset group via the group management interface.

Example 6 includes the method of example 5 wherein the password is exclusively reset from the secure domain.

Example 7 includes the method of any of examples 1-6 and further comprising receiving a personal identification number corresponding to the smart card to obtain the public and private keys.

Example 8 includes the method of example 7 and further comprising receiving the personal identification number prior to decrypting the new password.

In example 9, a computer implemented method of generating a new password for accessing user accounts in a multi domain environment includes receiving a certificate in a secure domain, the certificate securely identifying a user from a user domain and including a user public key, updating a user account data entry in an active directory in the secure domain with the public key, receiving a request to reset a user account password, verifying the request via the directory, generating a new password in response to the verification, encrypting the new password using the public key, and sending the encrypted password to the user in a user domain.

Example 10 includes the method of example 9 wherein receiving a request to reset a user account password includes monitoring a password reset group associated with a group synchronization service, and retrieving an indication of the user account associated with the request from the password reset group.

Example 11 includes the method of any of examples 9-10 wherein receiving a certificate in the secure domain comprises receiving the certificate from a secure file transfer service, wherein the certificate originated from a user's smart card via a user device.

Example 12 includes the method of example 11 wherein verifying the request via the directory comprises using the indication of the user account to access the directory to obtain the public key.

Example 13 includes the method of any of examples 9-12 wherein the encrypted password is sent to a user via email.

Example 14 includes the method of example 13 wherein the directory includes an email address for use in sending the email to the user.

Example 15 includes the method of any of examples 9-14 wherein the user account password is associated with a user account in the secure domain for access by a user device in the user domain.

In example 16, a device includes one or more processors and a memory device coupled to the one or more processors and having a program stored thereon for execution by the processor to perform operations. The operations include receiving a certificate in a secure domain, the certificate securely identifying a user from a user domain and including a user public key, updating a user account data entry in an active directory in the secure domain with the public key, receiving a request to reset a user account password, verifying the request via the directory, generating a new password in response to the verification, encrypting the new password using the public key, and sending the encrypted password to the user in a user domain.

Example 17 includes the device of example 16 wherein receiving a request to reset a user account password includes monitoring a password reset group associated with a group synchronization service, and retrieving an indication of the user account associated with the request from the password reset group.

Example 18 includes the device of any of examples 16-17 wherein receiving a certificate in the secure domain comprises receiving the certificate from a secure file transfer service, wherein the certificate originated from a user's smart card via a user device and wherein verifying the request via the directory comprises using the indication of the user account to access the directory to obtain the public key.

Example 19 includes the device of any of examples 16-18 wherein the encrypted password is sent to a user via email using an email address stored in the directory.

Example 20 includes the device of any of examples 16-19 wherein the user account password is associated with a user account in the secure domain for access by a user device in the user domain.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method of changing an account password in a multi-domain environment, the method comprising:
   obtaining a private key and a public key from a security card at a user device in a user domain;
   transferring the public key to a controller in a secure domain, wherein the public key is transferred as a certificate that includes the public key and a user identification and wherein an indication of a user account identifier is also transferred to a secure file transfer service for transfer to the controller in the secure domain;
   requesting a change of the account password;
   receiving a public key encrypted new account password from the secure domain, wherein the new account password is received after transfer of the certificate and indication of the user account identifier; and
   decrypting the new account password using the private key.

2. The method of claim 1 wherein the public key is transferred to the secure file transfer service via a certificate upload interface.

3. The method of claim 1 wherein requesting a change of the account password comprises requesting a password reset via a group management interface in the user domain.

4. The method of claim 3 wherein the indication of the user account is added to a password reset group with a limited time to live and must be alive for a new account password to be generated.

5. The method of claim 4 wherein the password is exclusively reset from the secure domain.

6. The method of claim 1 and further comprising receiving a personal identification number corresponding to a smart card to obtain the public and private keys.

7. The method of claim 6 and further comprising receiving the personal identification number prior to decrypting the new password.

8. A device comprising:
   one or more processors; and a memory device coupled to the one or more processors and having a program stored thereon for execution by the processor to perform operations comprising:

obtaining a private key and a public key from a security card at a user device in a user domain;

transferring the public key to a controller in a secure domain, wherein the public key is transferred as a certificate that includes the public key and a user identification and wherein an indication of a user account identifier is also transferred to a secure file transfer service for transfer to the controller in the secure domain;

requesting a change of a user account password;

receiving a public key encrypted new account password from the secure domain, wherein the new account password is received after transfer of the certificate and indication of the user account identifier; and decrypting the new account password using the private key.

9. The device of claim 8 wherein the public key is transferred to the secure file transfer service via a certificate upload interface.

10. The device of claim 8 wherein requesting a change of the account password comprises requesting a password reset via a group management interface.

11. The device of claim 10 wherein the password reset request adds an indication of a user account to a password reset group via the group management interface.

12. The device of claim 11 wherein the password is exclusively reset from the secure domain.

13. The device of claim 8 and further comprising receiving a personal identification number corresponding to a smart card to obtain the public and private keys.

14. The device of claim 13 and further comprising receiving the personal identification number prior to decrypting the new password.

15. A machine-readable storage device having instructions for execution by a processor of a machine to cause the processor to perform operations to perform a method, the operations comprising:

obtaining a private key and a public key from a security card at a user device in a user domain;

transferring the public key to a controller in a secure domain, wherein the public key is transferred as a certificate that includes the public key and a user identification and wherein an indication of a user account identifier is also transferred to a secure file transfer service for transfer to the controller in the secure domain;

requesting a change of a user account password;

receiving a public key encrypted new account password from the secure domain, wherein the new account password is received after transfer of the certificate and indication of the user account identifier; and decrypting the new account password using the private key.

16. The device of claim 15 wherein the public key is transferred to a secure file transfer service for transfer to the controller in the secure domain and wherein the public key is transferred to the secure file transfer service via a certificate upload interface.

17. The device of claim 15 wherein requesting a change of an account password comprises requesting a password reset via a group management interface and wherein the password reset request adds an indication of a user account to a password reset group via the group management interface.

18. The device of claim 17 wherein the password is exclusively reset from the secure domain, the device further comprising:

receiving a personal identification number corresponding to a smart card to obtain the public and private keys; and receiving the personal identification number prior to decrypting the new password.

\* \* \* \* \*